June 18, 1935.  E. H. LAND  2,005,426
POLARIZING VIZOR OR SUNSHADE
Filed Nov. 3, 1933
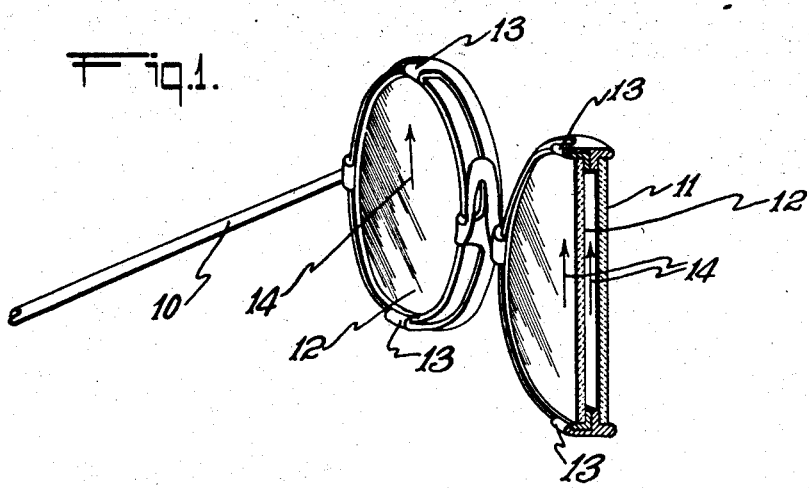
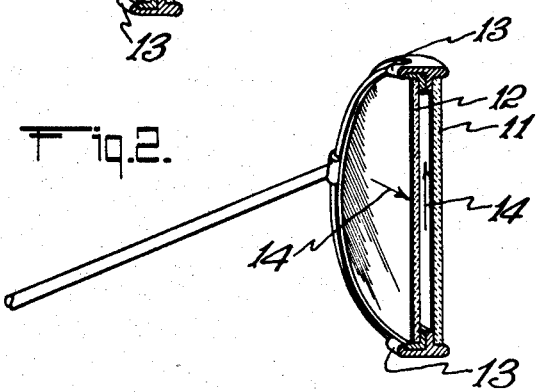
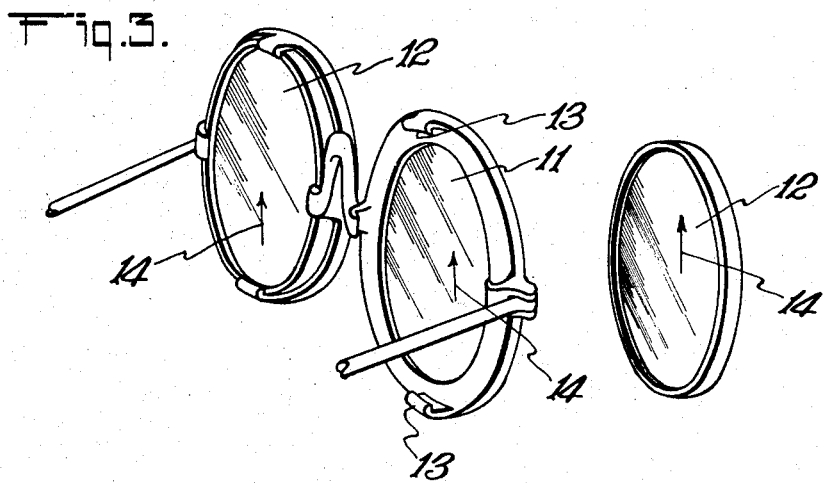
INVENTOR
Edwin H. Land
BY
Warfield & Brown
ATTORNEYS Patented June 18, 1935

2,005,426

UNITED STATES PATENT OFFICE 2,005,426

POLARIZING VIZOR OR SUNSHADE

Edwin H. Land, Wellesley Farms, Mass.

Application November 3, 1933, Serial No. 696,459

10 Claims. (Cl. 88—41)

This invention relates to an improved sun-glass, and more particularly to such a glass wherein the lenses or viewing screens comprise a plurality of superimposed light polarizing bodies.

The invention has for its object generally an improved sun-glass which may be produced in a convenient and efficient manner, and which is readily adapted to manufacturing procedure.

More specifically, the invention has for its object the provision of an improved sun-glass or eye shade adjustable to the wishes of the user, so that the lenses or viewing screens may be adjusted to pass any amount of light from a predetermined maximum to a predetermined minimum.

A further object of the invention is to provide such a sun-glass or eye shade in which a fixed lens or viewing screen is positioned over each eye of the user in such a way as to substantially prevent the passage of all light save that polarized to vibrate in a substantially vertical plane.

Other objects of the invention will in part be obvious and will in part appear hereinafter.

The invention accordingly comprises the article possessing the features, properties, and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing, in which:

Figure 1 is a view partly in perspective and partly in section, showing a sun-glass or eye shade embodying one form of the invention with the superimposed elements positioned so as to pass a maximum of light;

Fig. 2 is a view partly in perspective and partly in section of a portion of the device shown in Fig. 1, with the superimposed lenses positioned to pass a minimum of light; and Fig. 3 is a perspective view showing how the elements of the device may be assembled.

The present invention contemplates the use in connection with a suitable frame or mounting of a plurality of superimposed transparent light-polarizing lenses, one of which is preferably set in fixed relation to the mounting, and another of which is preferably carried in rotatable relation to the first mentioned lens. The lenses employed are adapted preferably to plane polarize light, that is to transmit light vibrating only in a single plane.

A principal problem in the manufacture of sunglasses or other glare vizors is the elimination of both the specular and the diffuse glare. Sometimes specular glare alone may be present, at other times diffuse glare alone may be present, and at still other times both specular and diffuse glare may be present. A sun-glass adapted for general use therefore must be designed to eliminate both specular and diffuse glare. At times, as, for example, when the glass is to be used on the water, it may be desirable to eliminate specular glare only without substantial diminution in the light received by diffusion from objects generally. Commercial sun-glasses and similar glare vizors have been designed largely with the idea of cutting down the light transmitted without discriminating between the often desirable diffuse light and the undesirable specular glare.

This invention contemplates a sun-glass or similar glare vizor which is adapted to eliminate specular glare and adjustably adapted for reducing the intensity of the diffused light to a point where that type of glare is eliminated.

In the embodiment of the invention shown in the drawing, 10 represents any suitable frame or supporting member which, as shown, may comprise an ordinary spectacle frame. This frame is adapted to carry a plurality of superimposed polarizing lenses 11 and 12. As shown in the drawing, one of these lenses, 11 for example, may be firmly and permanently mounted in the frame 10, while the other of these lenses 12 may be rotatably held by means of the lugs 13 in position adjacent the lens 11. The lugs 13 are preferably so designed as to hold the lens 12 frictionally against free movement, but not so tightly that the user of the glass cannot easily rotate the lens 12 if he should so desire. While the lens 12 has been shown as positioned preferably behind the lens 11, it will be obvious that, if desired, the rear lens may be permanently held in position by the frame and the front lens rotatably mounted in relation thereto.

In the drawing arrows 14 are shown associated with the lenses. These are intended to illustrate the polarizing axes of the lenses. For example, in Fig. 1 arrows 14 are shown as vertical in both the lenses 11 and 12. In the position shown in that figure it will be understood that each lens is adapted to transmit light vibrating only in a vertical plane. In Fig. 2 lens 12 is shown as rotated through an angle of substantially 90° so that its plane of polarization is now at right angles to that of lens 11. Lens 11 still is adapted to transmit light vibrating only in a vertical plane, whereas lens 12 is now adapted to transmit only light vibrating in a horizontal plane. In the position shown in Fig. 1, the glass is adapted to transmit a maximum of light, and in the position shown in Fig. 2, the combined lenses are adapted to transmit a minimum of light.

The lenses 11 and 12 may comprise a suitable polarizing body which, if desired, may be mounted between two sheets of thin glass as a protection. A suitable polarizing body may comprise a set suspension of polarizing particles in a transparent medium, the particles being oriented so that their polarizing axes are substantially aligned and held by the medium in fixed position. Such a polarizing body is disclosed in U. S. Patent No. 1,918,848, which issued July 18, 1933, to Edwin H. Land and Joseph S. Friedman. The polarizing body described and claimed in that patent may be employed in this invention without the protective covering of glass described above.

In Fig. 3 of the drawing is shown, in somewhat greater detail, the frame with its permanently held front lenses. One of the rotatable rear lenses is shown as detached from the frame and ready to be positioned and held thereagainst by the lugs 13.

The permanently positioned lenses should preferably be so mounted in the frame as to pass light vibrating in a plane perpendicular to the ground. It is intended that the glasses are to be used on beaches and other places where the glare from the light reflected from the surface of the water may be intense. Much of such light is polarized, its plane of vibration being parallel to the surface from which it is reflected, i. e., in the case of light reflected from water, it will be largely plane polarized to vibrate in a horizontal plane. As it is intended that this specular glare shall at all times be eliminated, it is desirable to position the fixed lens in the manner described above.

A polarizing body of the type previously described is preferably employed as it may be obtained in thin, durable transparent sheets and as it possesses unlimited angular aperture.

It will be obvious that other means of mounting the lenses may be employed than those shown, and if desired a greater number of lenses may be employed. Means may also be provided for synchronizing the movement of the two rotatable lenses.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a device of the character described, ophthalmic mounting means, and a plurality of pairs of cooperating light-polarizing bodies, at least one body of each of said pairs being firmly held by said mounting means in a position adapted to substantially eliminate specular glare, and at least one other body of each of said pairs being adjustably held by said mounting means in position to coperate with said first-mentioned body in the elimination of diffuse glare.

2. In a device of the character described, in combination, ophthalmic mounting means of such character that the device is adapted to be positioned on the head of the user, and a plurality of cooperating light-polarizing bodies of unlimited angular aperture overlying each other and so held by said mounting means that at least one of said bodies is rotatably positioned with respect to another of said bodies whereby upon rotation of said first mentioned body the density of the combined plurality may be altered.

3. In a device of the character described, in combination, mounting means adapted to position the device on the head of a user, a plurality of overlying, adjacent cooperating relatively thin light-polarizing bodies of unlimited angular aperture so held in said mounting means that light coming to one eye of a user traverses both of said bodies, one of said bodies being positioned to block light vibrating in a horizontal plane whereby specular glare, is eliminated, and another of said bodies being rotatably positioned with respect to said first-mentioned body and adapted in cooperation with said first-mentioned body to substantially eliminate diffuse glare and to alter the density of the said plurality of bodies.

4. A sun-glass comprising lens-mounting means adapted to hold and position two sets of viewing screens, each of said sets comprising a plurality of adjacent cooperating relatively thin light-polarizing bodies of unlimited angular aperture, one of said bodies being permanently positioned by said mounting means to transmit light vibrating only in a vertical plane when said sun-glass is in normal position on the head of a user, the other of said polarizing bodies being held by said mounting means in rotatable relation with respect to said first-mentioned polarizing body.

5. A sun-glass comprising lens-mounting means adapted to hold and position two sets of viewing screens, each of said sets comprising a plurality of adjacent cooperating relatively thin light-polarizing bodies of unlimited angular aperture, the outermost polarizing body of each of said sets being permanently held and positioned by said mounting means so as to substantially eliminate specular glare, and another of said polarizing bodies in each of said sets being rotatably held by said mounting means with respect to said first-mentioned bodies and being adapted in cooperation with said first-mentioned bodies to substantially eliminate diffuse glare.

6. A variable density sun-glass comprising a spectacle frame, and a plurality of light polarizing elements held in each eye-piece of said frame, at least one element of each plurality being rotatably held, said elements cooperating to change their combined capacity with the rotation of the rotatably held elements.

7. A variable density sun-glass comprising a spectacle frame, and a plurality of substantially transparent elements held in each eye-piece of said frame, at least one element of each plurality being rotatably mounted, said elements cooperating to change their combined opacity with the rotation of the rotatable element.

8. A variable density sun-glass comprising a spectacle frame, and a plurality of substantially transparent elements held in each eye-piece of said frame, at least one of said elements of each plurality being rotatably mounted, each plurality being adapted to transmit a maximum amount of light when the rotatable element thereof is positioned in a predetermined manner, and each plurality being adapted to transmit a less amount of light as the rotatable element thereof is rotated from said predetermined position.

9. A variable density sun-glass comprising a spectacle frame, a plurality of substantially transparent superimposed elements held in each eye-piece of said frame, at least one of said elements of each plurality being rotatably held, the elements of each plurality cooperating to vary the density of the plurality with the rotation of the rotatable element thereof.

10. A variable density sun-glass comprising a spectacle frame, a plurality of substantially transparent superimposed elements held in each eye-piece of said frame, at least one of said elements of each plurality being rotatably held, the elements of each plurality cooperating to vary the density of the plurality with the rotation of the rotatable element thereof, and means for synchronizing the movement of the rotatable elements of each plurality.

EDWIN H. LAND.